US008625901B2

United States Patent
Huang

(10) Patent No.: US 8,625,901 B2
(45) Date of Patent: Jan. 7, 2014

(54) METHOD FOR DYNAMICALLY ADJUSTING A WAITING TIME OF HANDWRITING INPUTS, ELECTRONIC EQUIPMENT AND COMPUTER-READABLE MEDIUM THEREOF

(75) Inventor: Yuh-Jay Huang, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 360 days.

(21) Appl. No.: 12/952,051

(22) Filed: Nov. 22, 2010

(65) Prior Publication Data

US 2011/0123116 A1    May 26, 2011

(30) Foreign Application Priority Data

Nov. 23, 2009  (TW) .................................. 98139760 A

(51) Int. Cl.
*G06K 9/00*    (2006.01)
(52) U.S. Cl.
USPC .......................................................... 382/189
(58) Field of Classification Search
None
See application file for complete search history.

(56) References Cited

U.S. PATENT DOCUMENTS

| 6,256,009 | B1  | 7/2001  | Lui |
| 2003/0007018 | A1 | 1/2003 | Seni |
| 2003/0038788 | A1 | 2/2003 | Demartines |
| 2003/0152268 | A1 | 8/2003 | Seto |
| 2004/0239639 | A1 | 12/2004 | Stavely |
| 2005/0028112 | A1* | 2/2005 | Iijima ............................ 715/856 |
| 2011/0279379 | A1* | 11/2011 | Morwing et al. ............. 345/173 |

FOREIGN PATENT DOCUMENTS

| TW | 448667 | 8/2001 |
| TW | 513656 | 12/2002 |
| TW | 200302985 | 8/2003 |
| TW | I283371 | 7/2007 |
| TW | 200947309 | 11/2009 |

OTHER PUBLICATIONS

European search report issued on Apr. 4, 2011 for EP application No. 10014886.5, filed Nov. 23, 2010, p. 1-6.
Office action mailed on Jan. 9, 2013 for the Taiwan application No. 098139760, filing date Nov. 23, 2009, p. 1-6.

* cited by examiner

*Primary Examiner* — Nirav G Patel
(74) *Attorney, Agent, or Firm* — Winston Hsu; Scott Margo

(57) ABSTRACT

A method for dynamically adjusting a waiting time of handwriting inputs is applied to an electronic equipment having a handwriting input device. When a waiting-for-input time after the handwriting input device receives a handwriting input exceeds a waiting time of the electronic equipment, the electronic equipment performs a handwriting recognition upon the handwriting input so as to display a candidate word list. The method includes the following steps: receiving the handwriting input; generating a writing speed according to the handwriting input; and setting the waiting time of the electronic equipment according to the writing speed.

22 Claims, 12 Drawing Sheets

METHOD FOR DYNAMICALLY ADJUSTING A WAITING TIME OF HANDWRITING INPUTS, ELECTRONIC EQUIPMENT AND COMPUTER-READABLE MEDIUM THEREOF

BACKGROUND OF THE INVENTION

1. Field of the Invention

The present invention relates to a method for dynamically adjusting a waiting time of handwriting inputs, an electronic equipment, and a related computer-readable medium, and more particularly, to a method for dynamically adjusting the waiting time of handwriting inputs according to at least a writing speed (or an air speed) of an handwriting input, an electronic equipment, and a related computer-readable medium.

2. Description of the Prior Art

In today's consumer electronics markets, portable electronic products such as personal digital assistants (PDAs), mobile phones, and PDA phones have already adopted a touch panel as their interface tool for data communication. Currently, the electronic products are usually designed with the trend of light weight and small size, and hence there is no enough space to accommodate conventional input devices such as keyboards or mice. Especially with the demands for human nature design in Tablet PCs, display devices equipped with a touch panel are becoming an important component of a variety of electronic products.

Handwriting input features provided by an electronic product currently on the market may set a default waiting time for the handwriting input itself or may provide a selection function to user for manually selecting the desired waiting time. When a waiting-for-input time after the electronic product receives a handwriting input exceeds the waiting time of the electronic product (such as, the default waiting time or the manually-selected waiting time from the user), it will perform a handwriting recognition upon the handwriting input. However, regardless of the default waiting time or the manually-selected waiting time from the user, the values are fixed (e.g., 3 seconds) after setting. But the writing speed of the handwriting input for the users is not fixed, and it varies from individual to individual or varies with time. In other words, the writing speeds of different users are different, even if the writing speeds of the same user will vary at different times. When the user performs the handwriting input with a faster writing speed, the default waiting time or the originally-selected waiting time has not expired yet at this time, such that the user must waste a long time upon waiting completion of the handwriting recognition. When the user performs the handwriting input with a slower writing speed, the default waiting time or the originally-selected waiting time has already ended at this time. As a result, the handwriting input process will be interrupted and correct handwriting recognition cannot be performed upon the handwriting input, which causes the user inconvenience and complications.

SUMMARY OF THE INVENTION

It is one of the objectives of the claimed invention to provide a method for dynamically adjusting a waiting time of handwriting inputs, an electronic equipment, and a related computer-readable medium to solve the abovementioned problems.

According to one example, a method for dynamically adjusting a waiting time of handwriting inputs, which is applied to an electronic equipment having a handwriting input device, is provided. The electronic equipment performs a handwriting recognition upon a handwriting input so as to display a candidate word list when a waiting-for-input time after the handwriting input device receives the handwriting input exceeds a waiting time of the electronic equipment. The method includes the following steps: receiving the handwriting input; generating a writing speed according to the handwriting input; and setting the waiting time of the electronic equipment according to the writing speed.

According to another example, a computer-readable medium is provided. The computer-readable medium stores a computer program having instructions for executing a method for dynamically adjusting waiting time of handwriting inputs of an electronic equipment having a handwriting input device, which cause the equipment the following steps: receiving a handwriting input; generating a writing speed according to the handwriting input; and setting the waiting time of the electronic equipment according to the writing speed. Herein when a waiting-for-input time after the handwriting input device receives the handwriting input exceeds the waiting time of the electronic equipment, the electronic equipment performs a handwriting recognition upon the handwriting input so as to display a candidate word list.

According to another example, an electronic equipment is provided. The electronic equipment includes a handwriting input device, a display screen, a handwriting recognition unit, a speed generating unit, and a waiting time setting unit. The handwriting input device has a writable area for receiving a handwriting input. The handwriting recognition unit is coupled to the handwriting input device and the display screen. When a waiting-for-input time after the handwriting input device receives a handwriting input exceeds a waiting time of the electronic equipment, the handwriting recognition unit performs a handwriting recognition upon the handwriting input so as to display a candidate word list on the display screen. The speed generating unit is coupled to the handwriting input device, for generating a writing speed according to the handwriting input. The waiting time setting unit is coupled to the speed generating unit, for setting the waiting time of the electronic equipment according to the writing speed.

DETAILED DESCRIPTION

Figure 1:
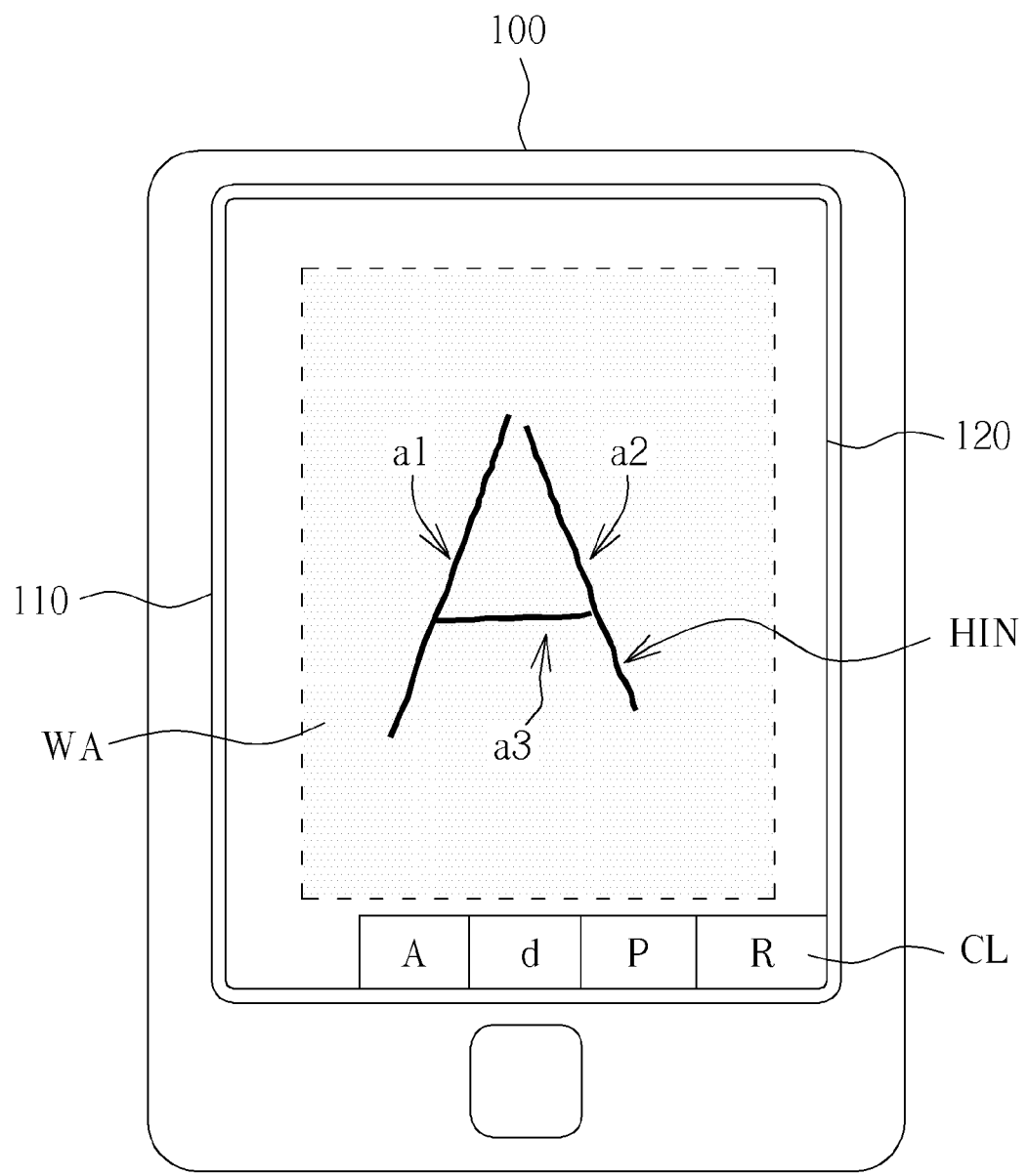
FIG. 1 is a diagram of an electronic equipment for dynamically adjusting a waiting time of handwriting inputs according to an example of the present invention.
Figure 2:
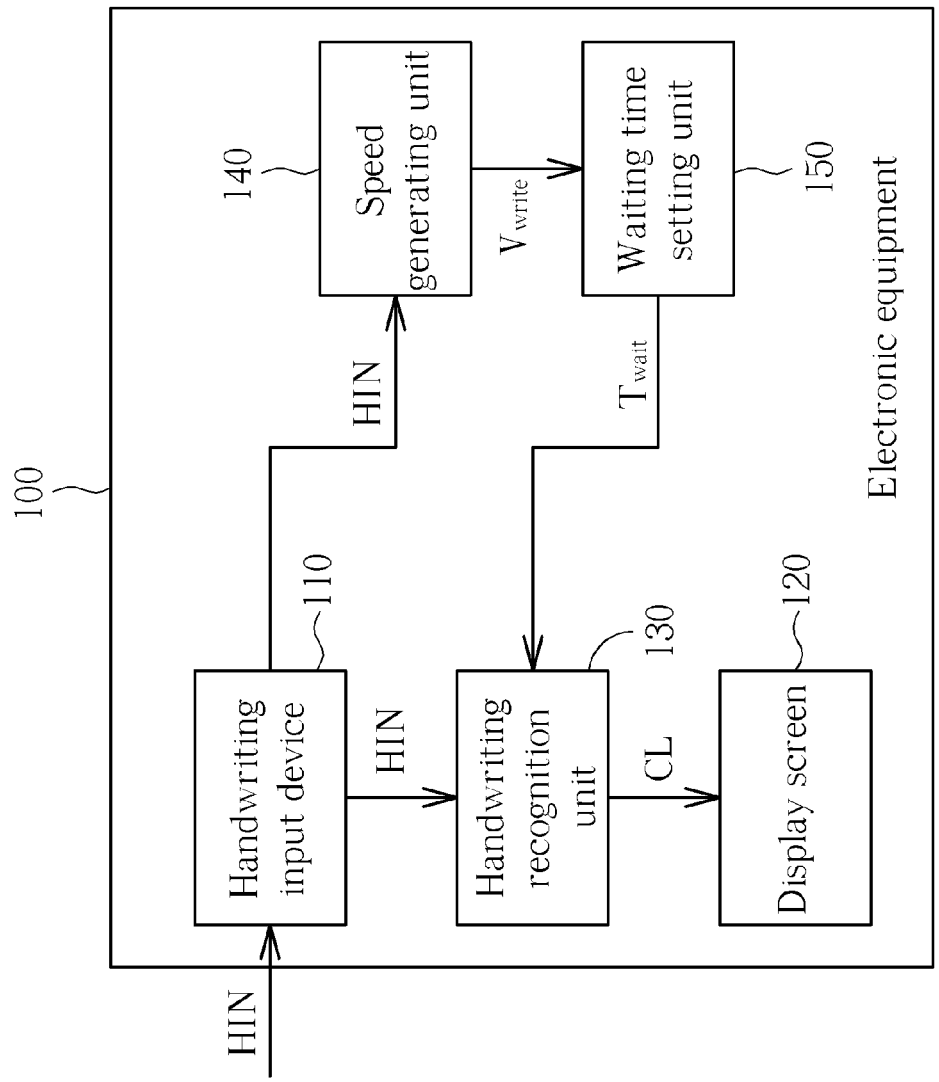
FIG. 2 is a block diagram of an electronic equipment for dynamically adjusting a waiting time of handwriting inputs according to a first example of the present invention.

Please refer to FIG. 1 together with FIG. 2. FIG. 1 is a diagram of an electronic equipment 100 for dynamically adjusting a waiting time of handwriting inputs according to an example of the present invention, and FIG. 2 is a block diagram of the electronic equipment 100 according to a first example of the present invention. In FIG. 1, the electronic equipment 100 may include a handwriting input device 110 and a display screen 120. In this example, the handwriting input device 110 as well as the display screen 120 are implemented by a touch screen. In other examples of the present invention, the handwriting input device 110 and the display screen 120 can be two separate devices, respectively. As an illustration, the handwriting input device 110 may be a touch panel, and the display screen 120 may be an LCD monitor. The handwriting input device 110 has a writable area WA, such as the dotted area shown in FIG. 1, for receiving a handwriting input HIN, wherein the handwriting input HIN may have at least one stroke. For example, the character "A" as shown in FIG. 1 has a first stroke a1, a second stroke a2, and a third stroke a3. As FIG. 2 depicts, the electronic equipment 100 may further include a handwriting recognition unit 130 coupled to the handwriting input device 110 and the display screen 120. When a waiting-for-input time Tin after the handwriting input device 110 receives the handwriting input HIN exceeds a waiting time Twait of the electronic equipment 100, the handwriting recognition unit 130 performs a handwriting recognition upon the handwriting input HIN so as to display a candidate wordlist (such as: the symbol CL shown in FIG. 1) on the display screen 120. Be noted that the aforementioned waiting-for-input time Tin means a timing that the handwriting input device 110 waits for receiving the next stroke of the handwriting input HIN after it receives the last stroke (e.g., the third stroke a3) of the handwriting input HIN.

Please note that the electronic equipment 100 may be a mobile phone, a personal digital assistant (PDA), a PDA phone, a smart phone, a laptop, a digital camera, a music player, or a game device. But the present invention is not limited to this only, and it can be any type of electronic equipments equipped with a handwriting input device, such as a personal computer or a car PC.

Please refer to FIG. 2 again. As shown in FIG. 2, except for the handwriting input device 110, the display screen 120, and the handwriting recognition unit 130, the electronic equipment 100 may further include a speed generating unit 140 and a waiting time setting unit 150. The speed generating unit 140 may be coupled to the handwriting input device 110, for generating a writing speed Vwrite according to the handwriting input HIN. The waiting time setting unit 150 may be coupled to the speed generating unit 140, for setting the waiting time Twait of the electronic equipment 100 according to the writing speed Vwrite. As an illustration, when a user performs the handwriting input HIN with a faster writing speed Vwrite, the electronic equipment 100 can set a shorter waiting time Twait (e.g., 1 second), such that it can prevent the user from wasting too much time upon waiting completion of the handwriting recognition. When the user performs the handwriting input HIN with a slower writing speed Vwrite, the electronic equipment 100 can set a longer waiting time Twait (e.g., 5 seconds). As a result, even if the writing speed Vwrite of the handwriting input HIN varies from individual to individual or varies with time, the waiting time Twait of the electronic equipment 100 can be dynamically adjusted depending on the writing speed Vwrite of the handwriting input HIN. Therefore, it can prevent the user from wasting too much time upon waiting beginning of the handwriting recognition after the handwriting input is completed, or it can prevent the handwriting input process from being interrupted by the handwriting recognition.

Please note that the aforementioned speed generating unit 140 generates the writing speed Vwrite according to the handwriting input HIN. In one example, the speed generating unit 140 calculates the writing speed Vwrite according to a last stroke or several last strokes of the handwriting input HIN. For example, the speed generating unit 140 can generate the writing speed Vwrite according to the last one stroke of the character "A" shown in FIG. 1, namely the third stroke a3; or it can generate the writing speed Vwrite according to the last two strokes of the character "A", namely the second stroke a2 together with the third stroke a3. In another example, the speed generating unit 140 can generate the writing speed Vwrite according to all strokes of the handwriting input HIN. Continuing with the example above, it can generate the writing speed Vwrite according to all strokes of the character "A" shown in FIG. 1, namely the strokes a1, a2, and a3. Be noted that those skilled in the art should appreciate that various modifications to the way how the speed generating unit 140 calculates the writing speed Vwrite may be made without departing from the spirit of the present invention, which also belongs to the scope of the present invention.

Figure 3:
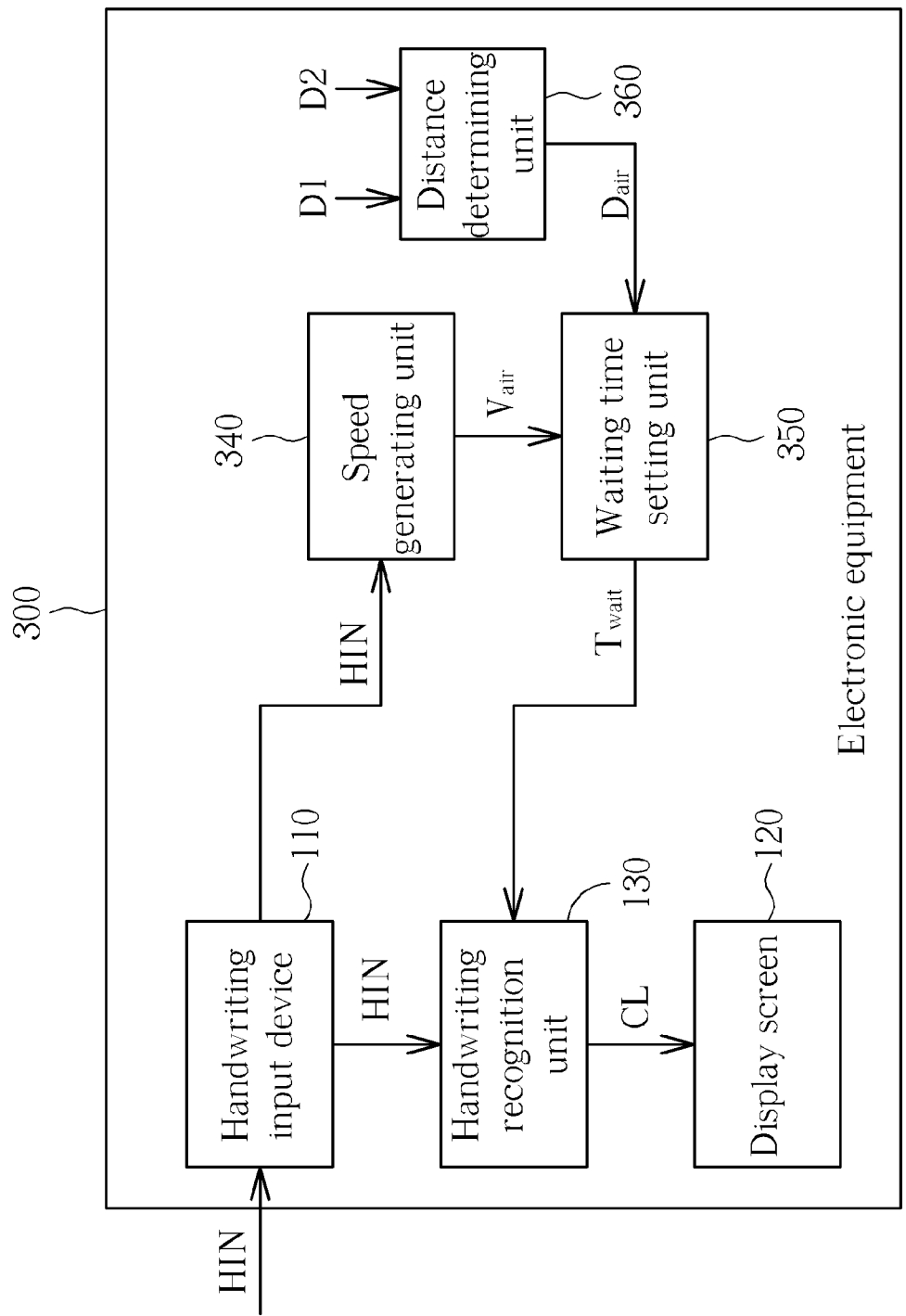
FIG. 3 is a block diagram of an electronic equipment for dynamically adjusting a waiting time of handwriting inputs according to a second example of the present invention.

Please refer to FIG. 3. FIG. 3 is a block diagram of an electronic equipment 300 for dynamically adjusting a waiting time of handwriting inputs according to a second example of the present invention. In FIG. 3, the architecture of the electronic equipment 300 is similar to that of the electronic equipment 100 shown in FIG. 2, and the difference between them is that the electronic equipment 300 may further include a distance determining unit 360 coupled to the waiting time setting unit 350 for determining an air moving distance Dair. In addition, the speed generating unit 340 as well as the waiting time setting unit 350 of the electronic equipment 300 are slightly different from the speed generating unit 140 as well as the waiting time setting unit 150 of the electronic equipment 100. In this example, the speed generating unit 340 may be further used for determining an air speed Vair according to the writing speed Vwrite; and the waiting time setting unit 350 may be further used for setting the waiting time Twait of the electronic equipment 300 according to the air speed Vair as well as the air moving distance Dair. As an illustration, the aforementioned air speed Vair, the air moving distance Dair, and the waiting time Twait can conform to the following equation:

$$Twait = Dair/Vair \qquad (1).$$

As can be known from the equation (1), the waiting time Twait of the electronic equipment 300 can be set as a quotient obtained from dividing the air moving distance Dair by the air speed Vair. But the abovementioned examples are presented merely for describing the present invention, and in no way should be considered as limitations of the present invention. As one skilled in the art will readily appreciate that any method for generating the waiting time Twait by means of the air speed Vair (or the writing speed Vwrite) and the air moving distance Dair should belong to the scope of the present invention.

In the following descriptions, several examples are cited for illustrating how the speed generating unit 340 of the electronic equipment 300 determines the air speed Vair according to the writing speed Vwrite. As for the same user, his/her writing speed Vwrite moving on the handwriting input device (e.g., 110) should be positive correlated to his/her air speed Vair moving on the air. For this reason, in one example, the speed generating unit 340 may determine the air speed Vair to be a designated proportion of the writing speed Vwrite, wherein the designated proportion can be adjusted depending upon actual design requirements. As an illustration, the designated proportion can be set as 90%, 100%, or 110%, wherein the writing speed Vwrite can be generated by means of the handwriting input HIN based on the aforementioned method.

Figure 4:
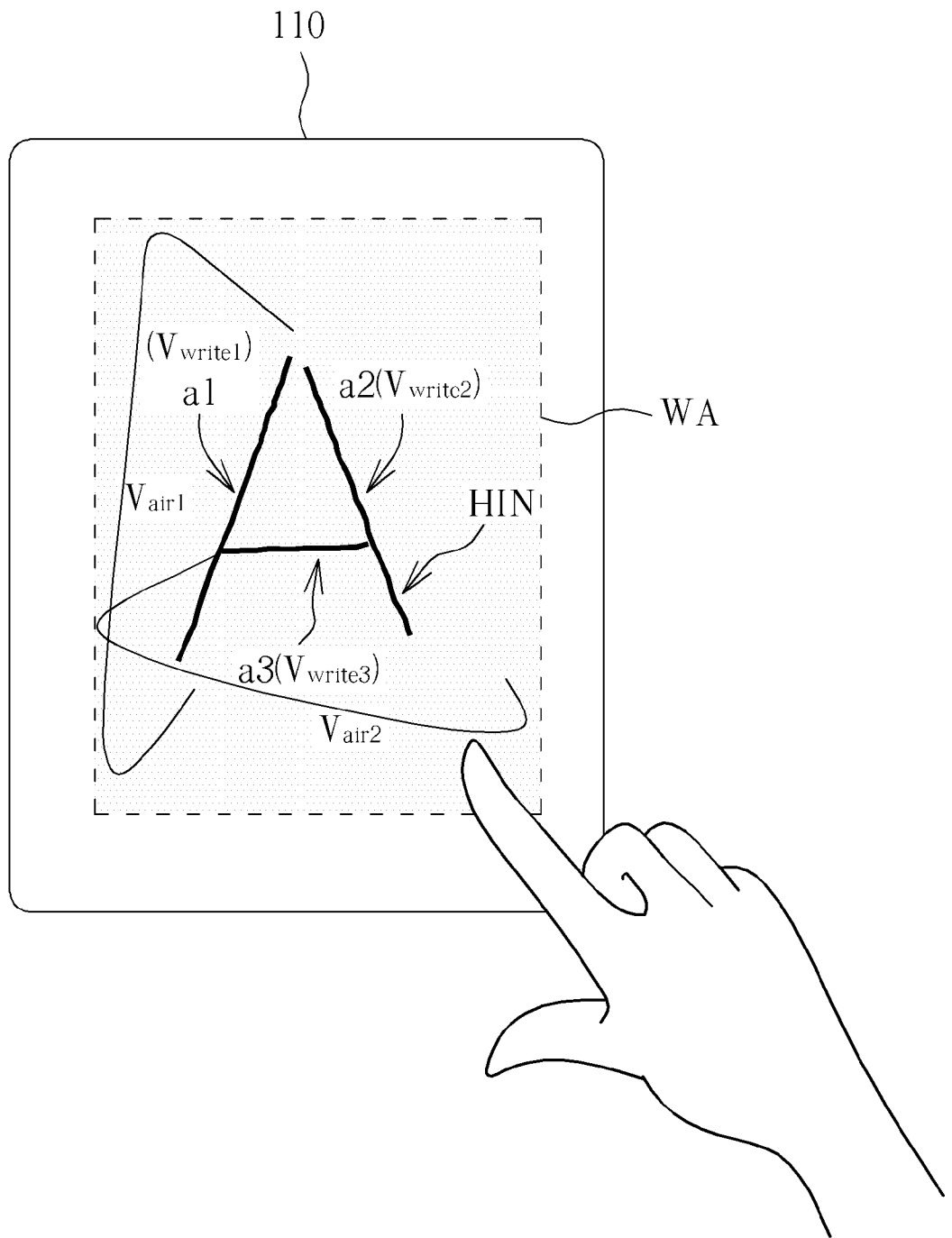
FIG. 4 is a diagram illustrating how to determine the air speed by reference to the writing speed according to an example of the present invention.

In another example, the speed generating unit 340 may directly generate the air speed Vair according to the writing speed of a last stroke, several last strokes, or all strokes of the handwriting input HIN. Here FIG. 4 is cited as an illustration. When the handwriting input device 110 has received the first stroke a1 of the character "A" and has not received the next stroke yet, the speed generating unit 340 may determine a first air speed Vair1, which is moved from the end of the first stroke a1 to the beginning of the next stroke, to be a writing speed Vwrite1 or to be any proportion of the writing speed Vwrite1. When the handwriting input device 110 has received the second stroke a2 of the character "A" and has not received the next stroke yet, the speed generating unit 340 may determine a second air speed Vair2, which is moved from the end of the second stroke a2 to the beginning of the next stroke, to be a writing speed Vwrite2 or to be any proportion of the writing speed Vwrite2. As another illustration, the speed generating unit 340 may also determine the second air speed Vair2 to be an average value of the writing speed Vwrite1 and the writing speed Vwrite2, that is to say, Vair2=(Vwrite1+Vwrite2)/2. Or it may also determine the second air speed Vair2 to be a sum having different proportions of the writing speed Vwrite1 and the writing speed Vwrite2, such as, Vair2=Vwrite1×20%+Vwrite2×80%.

Figure 5:
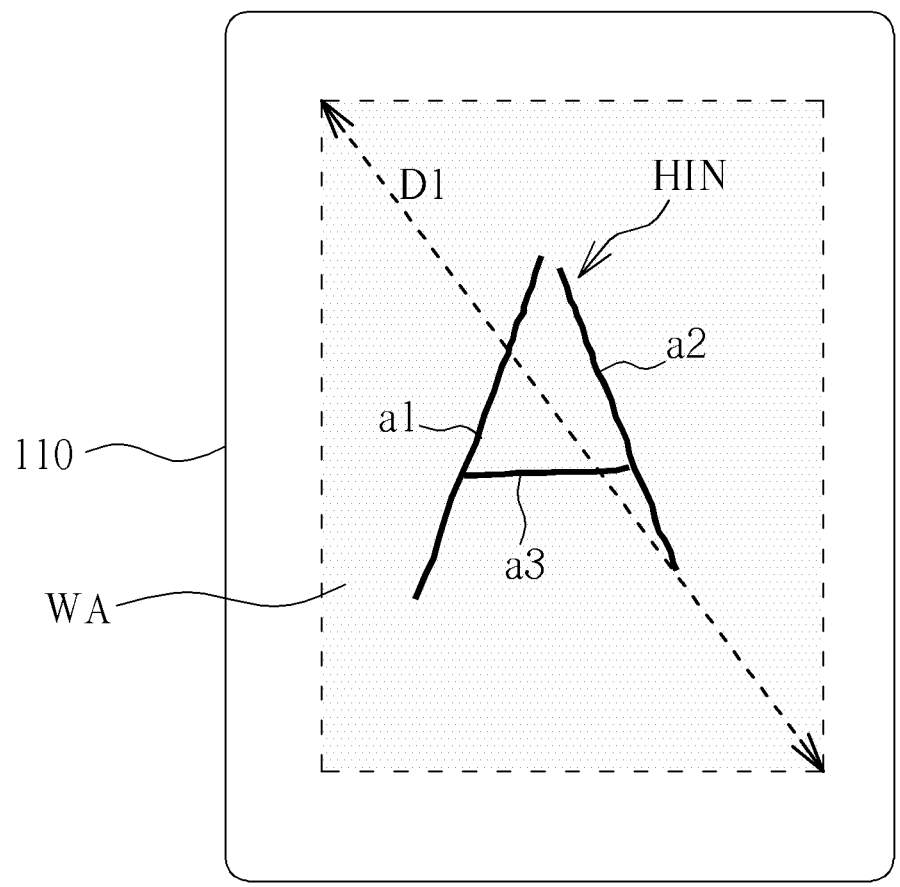
FIG. 5 is a diagram illustrating how to determine the air moving distance according to an example of the present invention.
Figure 6:
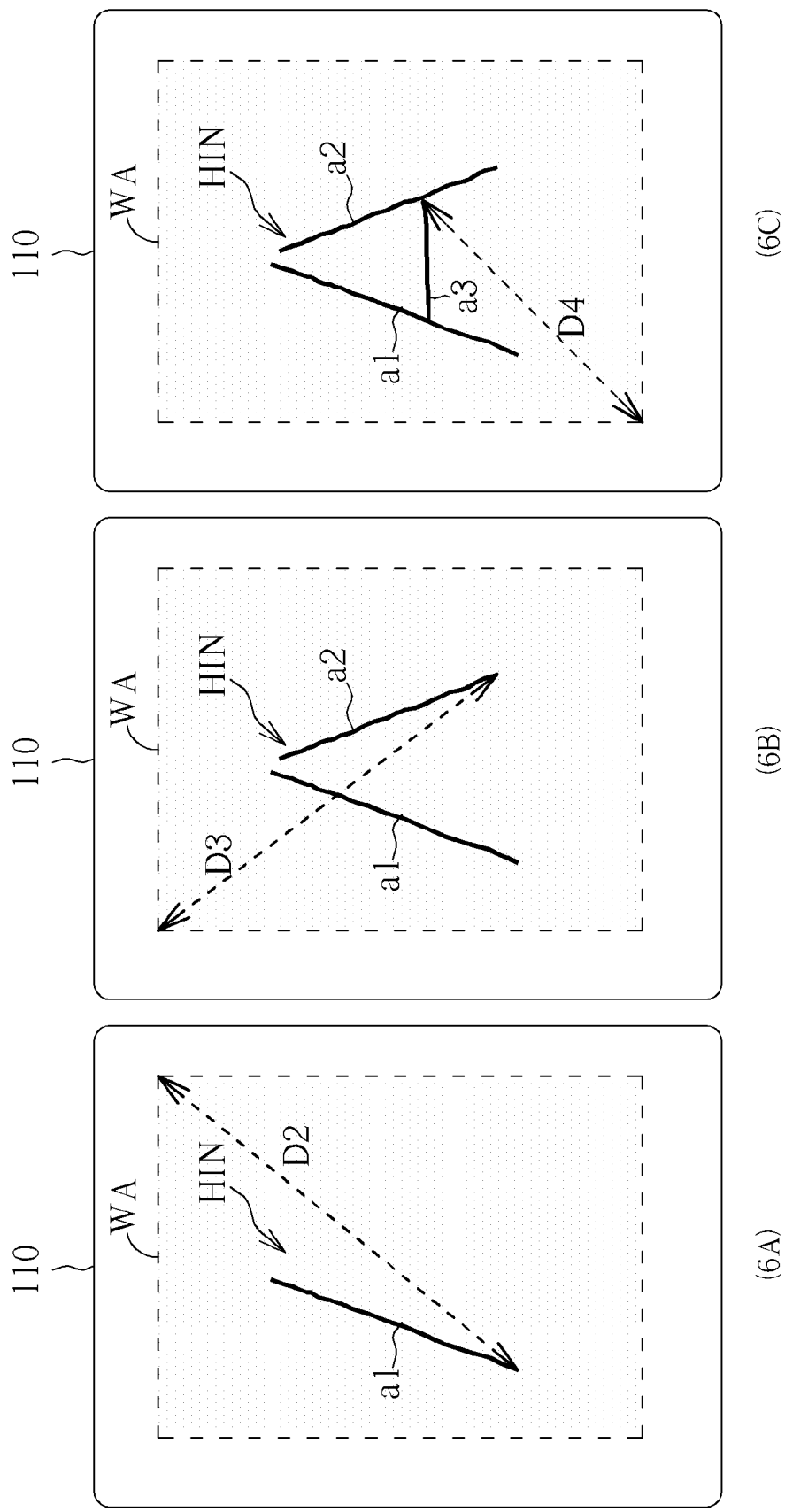
FIG. 6 (including 6A, 6B, and 6C) is a diagram illustrating how to determine the air moving distance according to another example of the present invention.

In the following descriptions, several examples are cited for illustrating how the distance determining unit 360 of the electronic equipment 300 determines the air moving distance Dair. In this example, the distance determining unit 360 may determine the air moving distance Dair according to a size of the writable area WA of the handwriting input device 110. In one example, the distance determining unit 360 may determine the air moving distance Dair to be a longest straight-line distance between any two points of the writable area WA or to be any proportion of the longest straight-line distance. For example, please also refer to FIG. 3 together with FIG. 5, the distance determining unit 360 may determine the air moving distance Dair to be a distance D1 or any proportion (e.g., 90% or 110%) of the distance D1. In another example, the distance determining unit 360 may determine the air moving distance Dair to be a longest straight-line distance between an end point of the last stroke of the handwriting input HIN and an edge of the writable area WA or to be any proportion of the longest straight-line distance. For example, please also refer to FIG. 6 (including 6A, 6B, and 6C). When the stroke a1 acts as the last stroke of the handwriting input HIN, the distance determining unit 360 may determine the air moving distance Dair to be a longest straight-line distance D2 between the end point of the stroke a1 and the edge of the writable area WA or to be any proportion (e.g., 90% or 110%) of the longest straight-line distance D2, which is shown as 6A. When the stroke a2 acts as the last stroke of the handwriting input HIN, the distance determining unit 360 may determine the air moving distance Dair to be a longest straight-line distance D3 between the endpoint of the stroke a2 and the edge of the writable area WA or to be any proportion of the longest straight-line distance D3, which is shown as 6B. When the stroke a3 acts as the last stroke of the handwriting input HIN, the distance determining unit 360 may determine the air moving distance Dair to be a longest straight-line distance D4 between the end point of the stroke a3 and the edge of the writable area WA or to be any proportion of the longest straight-line distance D4, which is shown as 6C.

Figure 7:
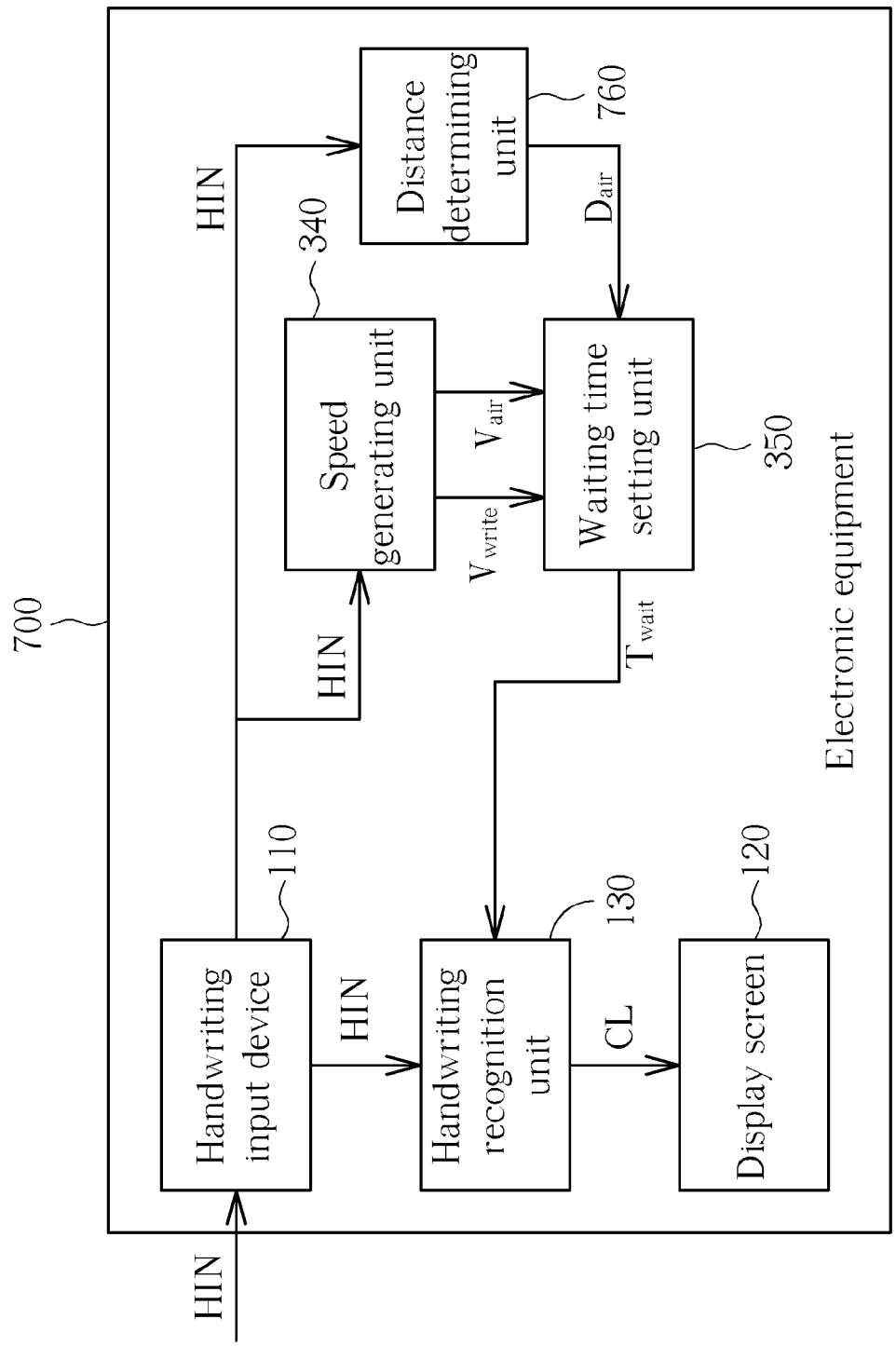
FIG. 7 is a block diagram of an electronic equipment for dynamically adjusting a waiting time of handwriting inputs according to a third example of the present invention.
Figure 8:
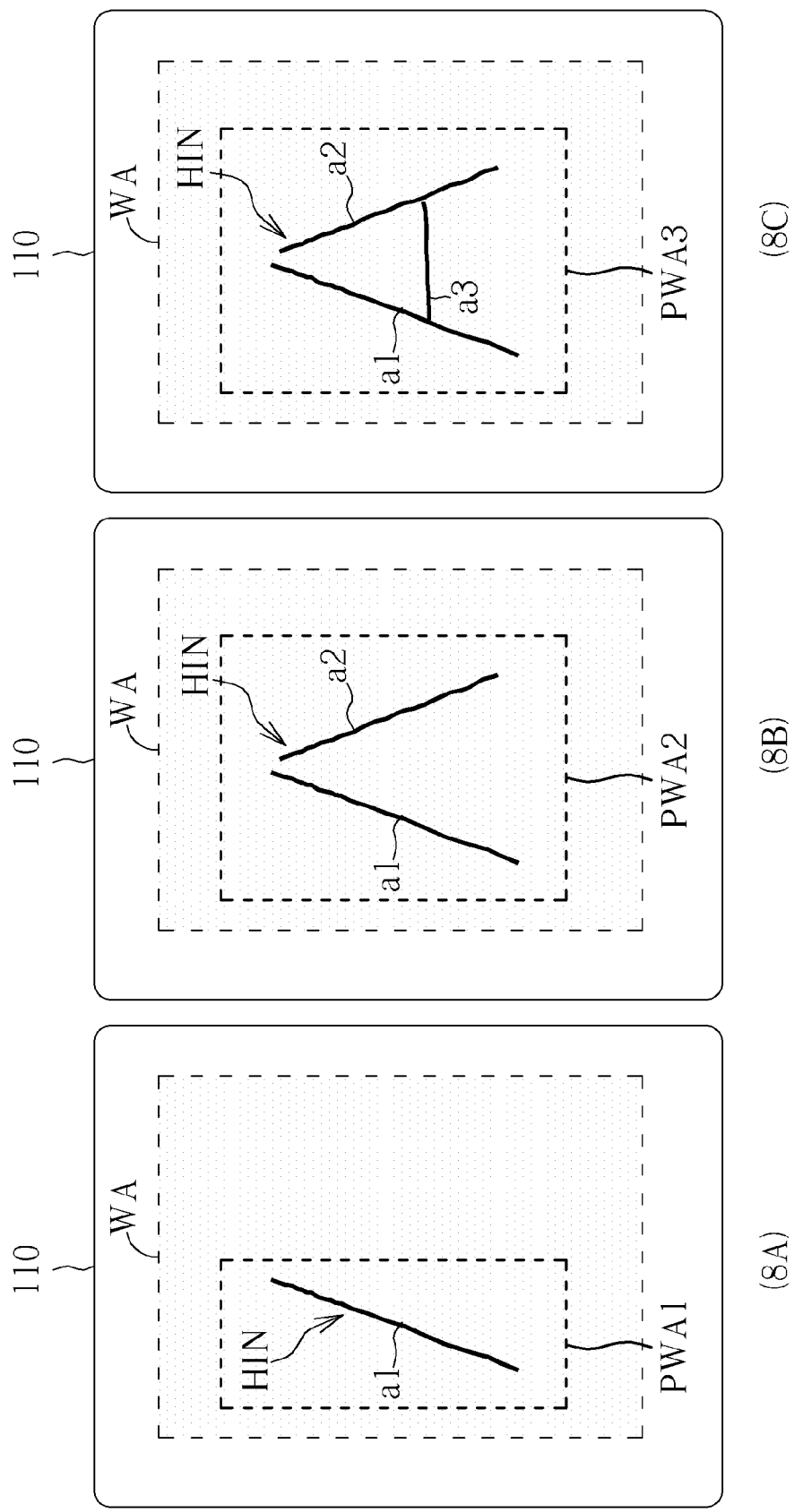
FIG. 8 (including 8A, 8B, and 8C) is a diagram illustrating how to estimate an actual writing area by reference to the handwriting input according to an example of the present invention.

In still another example, the air moving distance Dair is determined by estimating an input font size of the handwriting input HIN. Please refer to FIG. 7. FIG. 7 is a block diagram of an electronic equipment 700 for dynamically adjusting a waiting time of handwriting inputs according to a third example of the present invention. In FIG. 7, the architecture of the electronic equipment 700 is similar to that of the electronic equipment 300, and the difference between them is that a distance determining unit 760 of the electronic equipment 700 is further coupled to the handwriting input device 110 for estimating an actual writing area PWA according to the handwriting input HIN and for determining the air moving distance Dair according to the actual writing area PWA. Be noted that a size of the actual writing area PWA will be changed as the handwriting input HIN changes. For example, please also refer to FIG. 7 together with FIG. 8 (including 8A, 8B, and 8C), wherein FIG. 8 is a diagram illustrating how to estimate an actual writing area by reference to the handwriting input HIN according to an example of the present invention. When the stroke a1 acts as the last stroke of the handwriting input HIN, as is shown in 8A, the distance determining unit 760 may estimate the actual writing area of the handwriting input HIN to be PWA1 at this time according to the stroke a1. When the stroke a2 acts as the last stroke of the handwriting input HIN, as is shown in 8B, the distance determining unit 760 may estimate the actual writing area of the handwriting input HIN to be PWA2 at this time according to the strokes a1 and a2. When the stroke a3 acts as the last stroke of the handwriting input HIN, as is shown in 8C, the distance determining unit 760 may estimate the actual writing area of the handwriting input HIN to be PWA3 at this time according to the strokes a1, a 2, and a3. What calls for special attention is that: compared with the fixed writable area WA of the handwriting input device 110 (such as, the areas WA denoted in 8A, 8B, and 8C), the size of the actual writing area PWA will be changed as the handwriting input HIN changes (such as, the area PWA1 denoted in 8A, the area PWA2 denoted in 8B, and the area PWA3 denoted in 8C).

Figure 9:
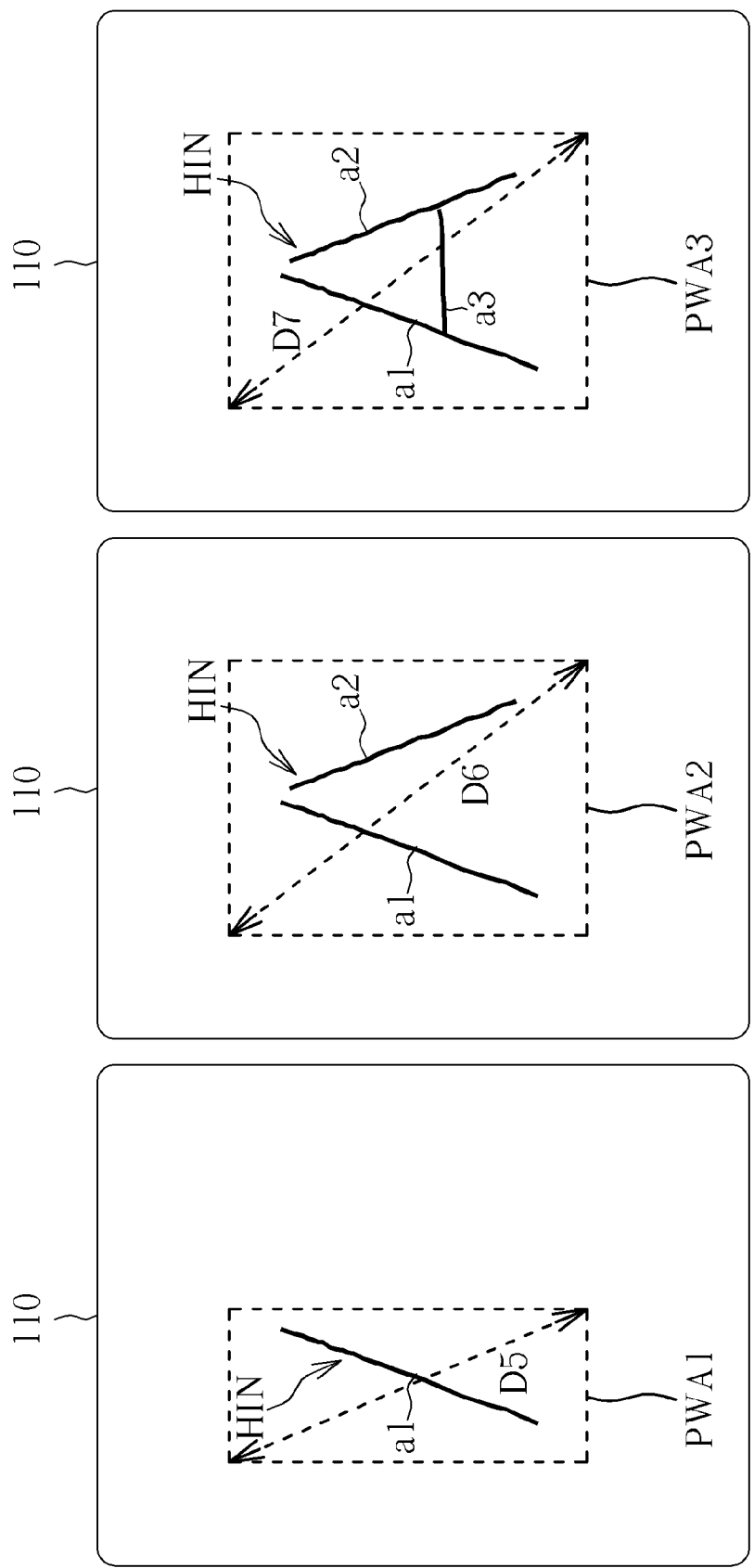
FIG. 9 (including 9A, 9B, and 9C) is a diagram illustrating how to determine the air moving distance by reference to the actual writing area according to an example of the present invention.

After that, the distance determining unit 760 may determine the air moving distance Dair according to the actual writing area PWA. In one example, the distance determining unit 760 may determine the air moving distance Dair to be a diagonal distance of the actual writing area (such as, the areas PWA1, PWA2, and PWA3 denoted in FIG. 8) or to be any proportion (e.g., 90% or 110%) of the diagonal distance. As an illustration, please refer to FIG. 7 together with FIG. 9

(including 9A, 9B, and 9C). Continuing with the example above, when the stroke a1 acts as the last stroke of the handwriting input HIN, the distance determining unit 760 may determine the air moving distance Dair to be a diagonal distance D5 of the actual writing area PWA1 or to be any proportion (e.g., 90% or 110%) of the diagonal distance D5, which is shown as 9A. When the stroke a2 acts as the last stroke of the handwriting input HIN, the distance determining unit 760 may determine the air moving distance Dair to be a diagonal distance D6 of the actual writing area PWA2 or to be any proportion (e.g., 90% or 110%) of the diagonal distance D6, which is shown as 9B. When the stroke a3 acts as the last stroke of the handwriting input HIN, the distance determining unit 760 may determine the air moving distance Dair to be a diagonal distance D7 of the actual writing area PWA3 or to be any proportional (e.g., 90% or 110%) of the diagonal distance D7, which is shown as 9C.

Figure 10:
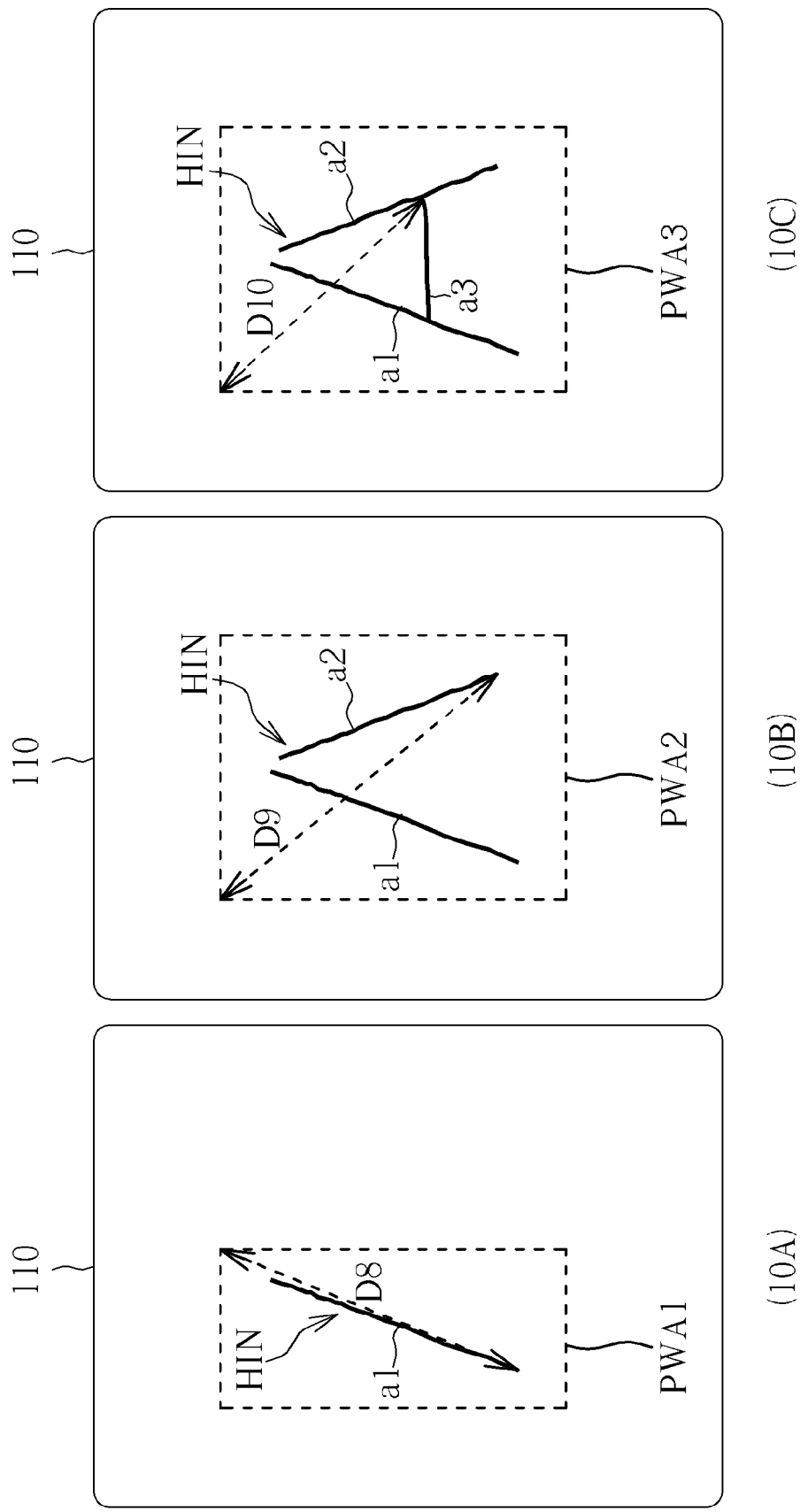
FIG. 10 (including 10A, 10B, and 10C) is a diagram illustrating how to determine the air moving distance by reference to the actual writing area according to another example of the present invention.

In another example, the distance determining unit 760 may determine the air moving distance Dair to be a longest straight-line distance between an end point of the last stroke of the handwriting input HIN and an edge of the actual writing area (such as, the areas PWA1, PWA2, and PWA3 denoted in FIG. 8) or to be any proportion of the longest straight-line distance. As an illustration, please refer to FIG. 7 together with FIG. 10 (including 10A, 10B, and 10C). Continuing with the example above, when the stroke a1 acts as the last stroke of the handwriting input HIN, the distance determining unit 760 may determine the air moving distance Dair to be a longest straight-line distance D8 between the end point of the last stroke a1 and the edge of the actual writing area PWA1 or to be any proportion (e.g., 90% or 110%) of the longest straight-line distance D8, which is shown as 10A. When the stroke a2 acts as the last stroke of the handwriting input HIN, the distance determining unit 760 may determine the air moving distance Dair to be a longest straight-line distance D9 between the end point of the last stroke a2 and the edge of the actual writing area PWA2 or to be any proportion (e.g., 90% or 110%) of the longest straight-line distance D9, which is shown as 10B. When the stroke a3 acts as the last stroke of the handwriting input HIN, the distance determining unit 760 may determine the air moving distance Dair to be a longest straight-line distance D10 between the end point of the last stroke a3 and the edge of the actual writing area PWA3 or to be any proportion (e.g., 90% or 110%) of the longest straight-line distance D10, which is shown as 10C.

Figure 11:
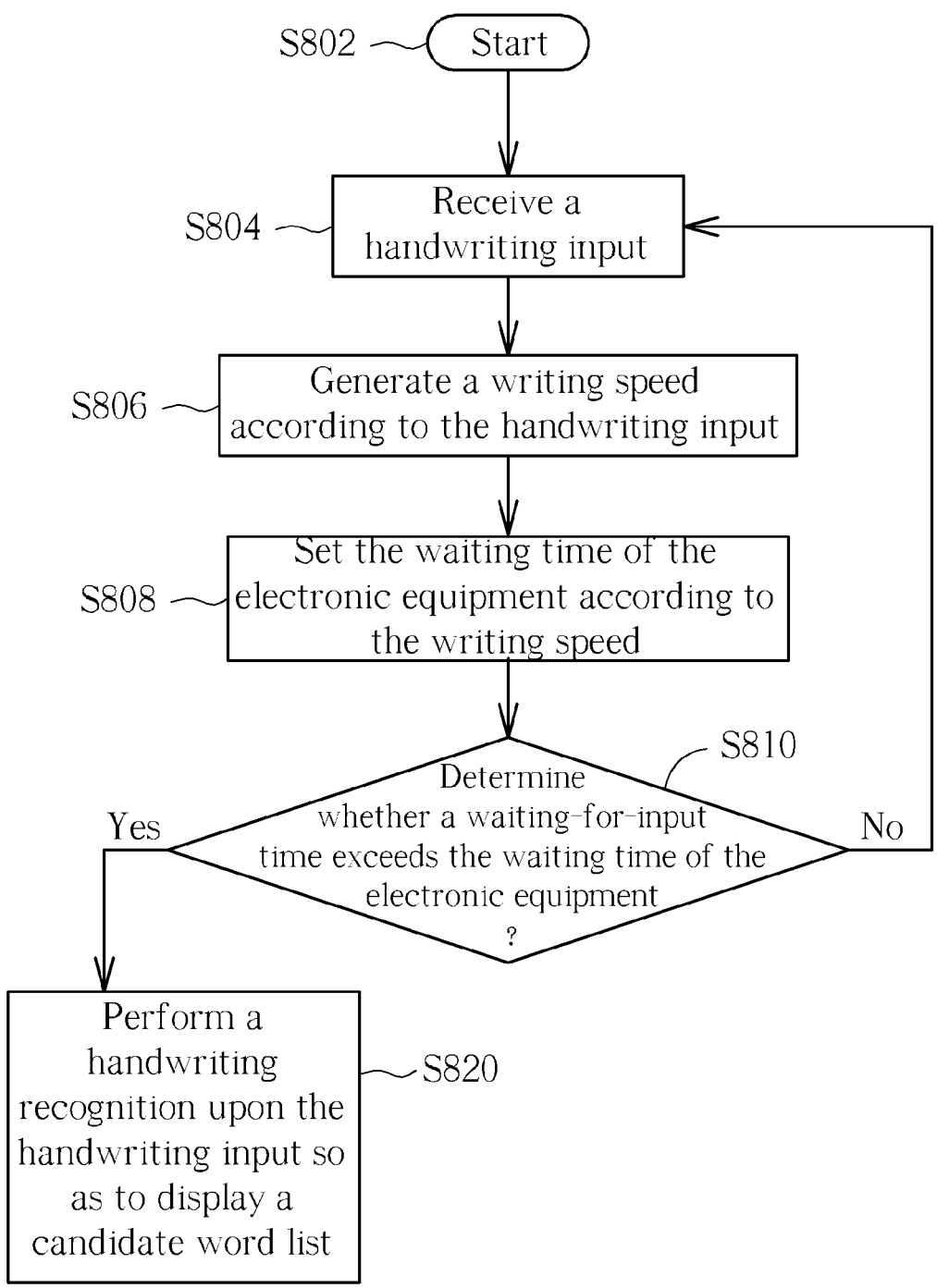
FIG. 11 is a flowchart illustrating a method for dynamically adjusting a waiting time of handwriting inputs according to an exemplary example of the present invention.

Please refer to FIG. 11. FIG. 11 is a flowchart illustrating a method for dynamically adjusting a waiting time of handwriting inputs according to an exemplary example of the present invention. The method includes the following steps:

Step S802: Start.
Step S804: Receive a handwriting input.
Step S806: Generate a writing speed according to the handwriting input.
Step S808: Set the waiting time of the electronic equipment according to the writing speed.
Step S810: Determine whether a waiting-for-input time exceeds the waiting time of the electronic equipment. When the waiting-for-input time exceeds the waiting time of the electronic equipment, go to the Step S820; otherwise, go back to the Step S804.
Step S820: Perform a handwriting recognition upon the handwriting input so as to display a candidate word list.

How each element operates can be known by collocating the steps shown in FIG. 11 together with the elements shown in FIG. 1 and FIG. 2. For example, the Step S804 can be executed by the handwriting input device 110, the Step S806 can be executed by the speed generating unit 140, the Step S808 can be executed by the waiting time setting unit 150, and the Steps S810 and S820 can be executed by the handwriting recognition unit 130. Therefore, further description for the operations of the steps shown in FIG. 11 is omitted here for brevity.

Figure 12:
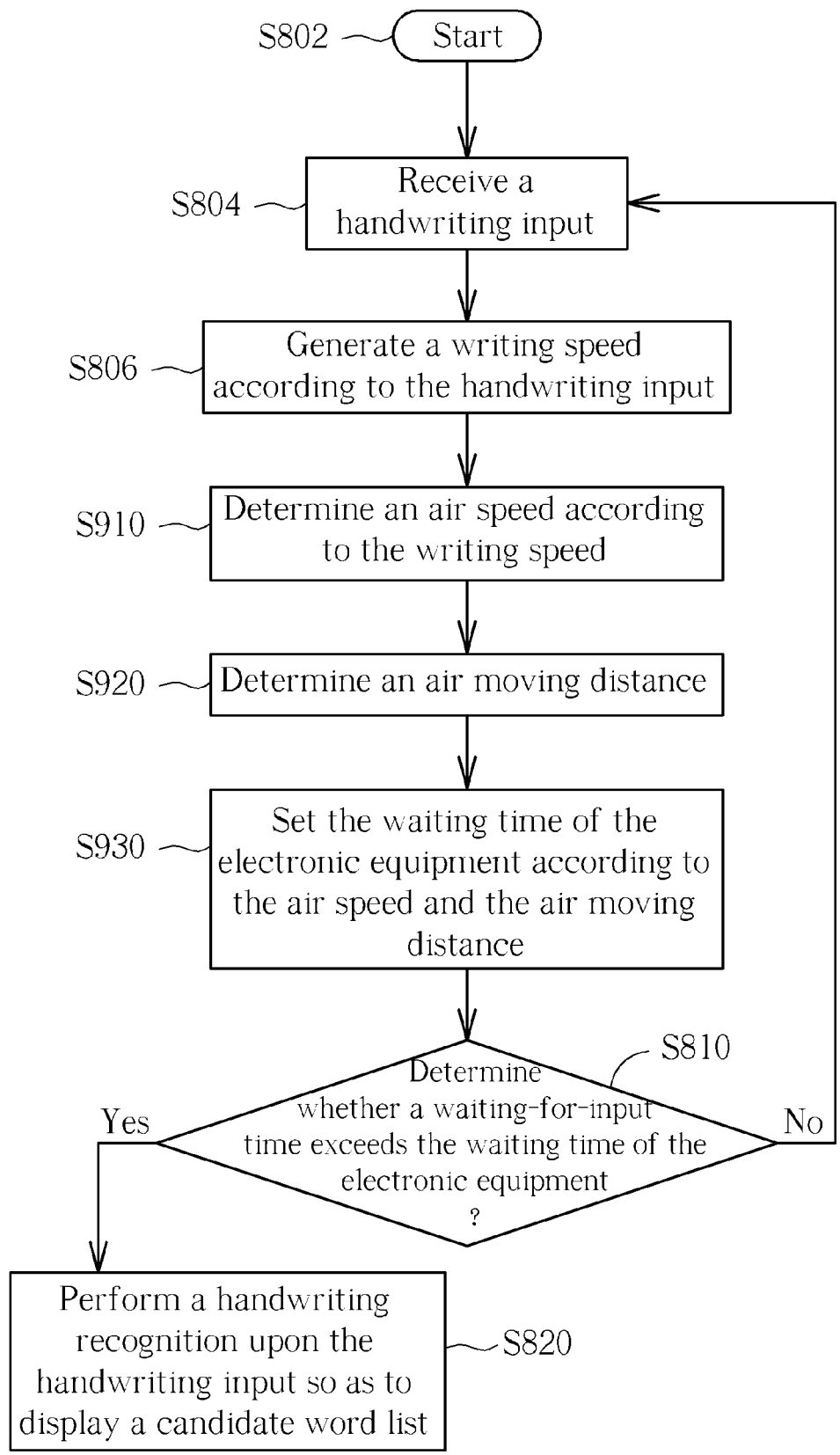
FIG. 12 is a flowchart illustrating a method for dynamically adjusting a waiting time of handwriting inputs according to another exemplary example of the present invention.

Please refer to FIG. 12. FIG. 12 is a flowchart illustrating a method for dynamically adjusting a waiting time of handwriting inputs according to another exemplary example of the present invention. Please note that the following steps are not limited to be performed according to the exact sequence shown in FIG. 12 if a roughly identical result can be obtained. The method includes, but is not limited to, the following steps:

Step S802: Start.
Step S804: Receive a handwriting input.
Step S806: Generate a writing speed according to the handwriting input.
Step S910: Determine an air speed according to the writing speed.
Step S920: Determine an air moving distance.
Step S930: Set the waiting time of the electronic equipment according to the air speed and the air moving distance.
Step S810: Determine whether a waiting-for-input time exceeds the waiting time of the electronic equipment. When the waiting-for-input time exceeds the waiting time of the electronic equipment, go to the Step S820; otherwise, go back to the Step S804.
Step S820: Perform a handwriting recognition upon the handwriting input so as to display a candidate word list.

The steps shown in FIG. 12 are similar to the steps shown in FIG. 11, and the difference between them is that FIG. 12 further adds a step for determining the air speed (S910) and a step for determining air moving distance (S920) into the flowchart, and the Step S930 denoted in FIG. 12 is used for replacing the Step S808 denoted in FIG. 11. How each element operates can be known by collocating the steps shown in FIG. 12 together with the elements shown in FIG. 1 and FIG. 3 (or FIG. 7). For example, the Step S804 can be executed by the handwriting input device 110, the Steps S806 and S910 can be executed by the speed generating unit 340, the Step S920 can be executed by the distance determining unit 360 or 760, the Step S930 can be executed by the waiting time setting unit 350, and the Steps S810 and S820 can be executed by the handwriting recognition unit 130. Therefore, further description for the operations of the steps shown in FIG. 12 is omitted here for brevity. What calls for special attention is that the abovementioned steps are not limited to be performed according to the exact sequence shown in FIG. 12 if a roughly identical result can be obtained. For example, in Step S920, the air moving distance can be determined according to a size of a writable area of the handwriting input device or a size of an actual writing area of the handwriting input. If the air moving distance is determined according to the size of the writable area of the handwriting input device in the Step S920, then the Step S920 can be executed at any moment before the Step S930 is executed; or if the air moving distance is determined according to the handwriting input in the Step S920, then the Step S920 can be executed at any moment in between the Step S804 and the Step S930, which also belongs to the scope of the present invention.

Please note that, the steps of the abovementioned flowchart are merely practicable examples of the present invention, and in no way should be considered to be limitations of the scope of the present invention. These methods, as shown in FIG. 11 and FIG. 12, can include other intermediate steps or several steps can be merged into a single step without departing from the spirit of the present invention.

Additionally, a computer-readable medium is disclosed according to an example of the present invention. When the computer-readable medium is loaded to an electronic equipment equipped with buffer memory, the electronic equipment executes instructions for performing a method for dynamically adjusting a waiting time of handwriting inputs disclosed in the present invention.

The abovementioned examples are presented merely for describing the features of the present invention, and in no way should be considered to be limitations of the scope of the present invention. In summary, the present invention provides a method for dynamically adjusting a waiting time of handwriting inputs, a computer-readable medium, and a related electronic equipment. The mechanism for dynamically adjusting the waiting time of handwriting inputs disclosed in the present invention employs the writing speed Vwrite of the handwriting input to dynamically set the waiting time Twait of the electronic equipment. That is to say, when the user performs the handwriting input with a faster writing speed Vwrite, the electronic equipment can set a shorter waiting time Twait (e.g., 1 second), such that is can prevent the user from wasting too much time upon waiting completion of the handwriting recognition. When the user performs the handwriting input with a slower writing speed Vwrite, the electronic equipment can set a longer waiting time Twait (e.g., 5 seconds). As a result, it can prevent the handwriting input process from being interrupted, such that correct handwriting recognition cannot be performed upon the handwriting input. Be noted that the writing speed Vwrite can be generated according to at least a last stroke or all strokes of the handwriting input. Furthermore, the air moving distance Dair can be determined by estimating an input font size of the handwriting input (i.e., the actual writing area) or by reference to a size of the writable area of the handwriting input device, and then the waiting time Twait can be further set according to the air speed Vair (or the writing speed Vwrite) as well as the air moving distance Dair, which also belongs to the scope of the present invention.

Those skilled in the art will readily observe that numerous modifications and alterations of the device and method may be made while retaining the teachings of the invention.

What is claimed is:

1. A method for dynamically adjusting waiting time of handwriting inputs, applied to an electronic equipment having a handwriting input device, the electronic equipment starting to perform a handwriting recognition upon a handwriting input so as to display a candidate word list only when a waiting-for-input time after the handwriting input device receives the handwriting input exceeds a waiting time of the electronic equipment, wherein the waiting-for-input time is a timing that the handwriting input device waits for receiving a next stroke of the handwriting input after receiving a last stroke of the handwriting input, and the method comprising the following steps:

receiving the handwriting input;

generating a writing speed according to the handwriting input; and setting the waiting time of the electronic equipment according to the writing speed.

2. The method of claim 1, further comprising the following steps:

determining an air moving distance;

wherein the step of setting the waiting time of the electronic equipment according to the writing speed comprises:

determining an air speed according to the writing speed; and setting the waiting time of the electronic equipment according to the air speed and the air moving distance.

3. The method of claim 2, wherein the air speed, the air moving distance, and the waiting time conform to the following equation:

$$Twait = Dair/Vair;$$

wherein Twait represents the waiting time, Dair represents the air moving distance, and Vair represents the air speed.

4. The method of claim 2, wherein the step of determining the air speed according to the writing speed comprises:

determining the air speed to be a designated proportion of the writing speed.

5. The method of claim 2, wherein the step of determining the air moving distance comprises:

estimating an actual writing area according to the handwriting input; and determining the air moving distance according to a size of the actual writing area.

6. The method of claim 2, wherein the step of determining the air moving distance comprises:

determining the air moving distance according to a size of a writable area of the handwriting input device.

7. The method of claim 6, wherein the step of determining the air moving distance according to the size of the writable area comprises:

determining the air moving distance according to a diagonal distance of the writable area, wherein the air moving distance is determined to be a designated proportion of the diagonal distance.

8. The method of claim 6, wherein the step of determining the air moving distance according to the size of the writable area comprises:

determining the air moving distance according to a longest straight-line distance between an end point of a last stroke of the handwriting input and an edge of the writable area, wherein the air moving distance is determined to be a designated proportion of the longest straight-line distance.

9. The method of claim 1, wherein the step of generating the writing speed according to the handwriting input comprises:

generating the writing speed according to at least a last stroke of the handwriting input.

10. The method of claim 1, wherein the step of generating the writing speed according to the handwriting input comprises:

generating the writing speed according to all strokes of the handwriting input.

11. A non-transitory computer-readable medium storing a computer program having instructions for executing a method for dynamically adjusting waiting time of handwriting inputs of an electronic equipment having a handwriting input device, which cause the electronic device, when loaded, to execute the following steps:

receiving a handwriting input;

generating a writing speed according to the handwriting input; and setting the waiting time of the electronic equipment according to the writing speed;

wherein the electronic equipment is further used for starting to perform a handwriting recognition upon the handwriting input so as to display a candidate word list only when a waiting-for-input time after the handwriting input device receives the handwriting input exceeds the waiting time of the electronic equipment, where the waiting-for-input time is a timing that the handwriting input device waits for receiving a next stroke of the handwriting input after receiving a last stroke of the handwriting input.

12. An electronic equipment, comprising:

a handwriting input device, having a writable area for receiving a handwriting input;

a display screen;

a handwriting recognition unit, coupled to the handwriting input device and the display screen, wherein only when a waiting-for-input time after the handwriting input device receives a handwriting input exceeds a waiting time of the electronic equipment, the handwriting recognition unit starts to perform a handwriting recognition upon the handwriting input so as to display a candidate word list on the display screen, wherein the waiting-for-input time is a timing that the handwriting input device waits for receiving a next stroke of the handwriting input after receiving a last stroke of the handwriting input;

a speed generating unit, coupled to the handwriting input device, for generating a writing speed according to the handwriting input; and a waiting time setting unit, coupled to the speed generating unit, for setting the waiting time of the electronic equipment according to the writing speed.

13. The electronic equipment of claim 12, further comprising:

a distance determining unit, coupled to the waiting time setting unit, for determining an air moving distance;

wherein the speed generating unit is further used for determining an air speed according to the writing speed; and the waiting time setting unit is further used for setting the waiting time of the electronic equipment according to the air speed and the air moving distance.

14. The electronic equipment of claim 13, wherein the air speed, the air moving distance, and the waiting time conform to the following equation:

$$T\text{wait} = D\text{air}/V\text{air};$$

wherein Twait represents the waiting time, Dair represents the air moving distance, and Vair represents the air speed.

15. The electronic equipment of claim 13, wherein the speed generating unit determines the air speed to be a designated proportion of the writing speed.

16. The electronic equipment of claim 13, wherein the distance determining unit is further coupled to the handwriting input device, for estimating an actual writing area according to the handwriting input and for determining the air moving distance according to a size of the actual writing area.

17. The electronic equipment of claim 13, wherein the distance determining unit further determines the air moving distance according to a size of the writable area of the handwriting input device.

18. The electronic equipment of claim 13, wherein the distance determining unit determines the air moving distance according to a diagonal distance of the writable area, and the air moving distance is determined to be a designated proportion of the diagonal distance.

19. The electronic equipment of claim 13, wherein the distance determining unit determines the air moving distance according to a longest straight-line distance between an end point of a last stroke of the handwriting input and an edge of the writable area, and the air moving distance is determined to be a designated proportion of the longest straight-line distance.

20. The electronic equipment of claim 12, wherein the speed generating unit generates the writing speed according to at least a last stroke of the handwriting input.

21. The electronic equipment of claim 12, wherein the speed generating unit generates the writing speed according to all strokes of the handwriting input.

22. The electronic equipment of claim 12, being a mobile phone, a personal digital assistant (PDA), a PDA phone, a smart phone, a laptop, a digital camera, a music player, or a game device.

* * * * *